United States Patent [19]

Tanino et al.

[11] Patent Number: 4,601,177
[45] Date of Patent: Jul. 22, 1986

[54] REFRIGERANT OVER-CHARGING CHECKING SYSTEM OF CLOSED CIRCUIT REFRIGERATION AIR COOLING SYSTEM

[75] Inventors: Mikio Tanino, Hatano; Eiji Tada, Fujisawa; Tsutomu Takano, Zama, all of Japan

[73] Assignee: Nissan Motor Co., Ltd., Japan

[21] Appl. No.: 748,474

[22] Filed: Jun. 25, 1985

[30] Foreign Application Priority Data

| Jun. 26, 1984 | [JP] | Japan | 59-131630 |
| Sep. 11, 1984 | [JP] | Japan | 59-190017 |
| Oct. 2, 1984 | [JP] | Japan | 59-206825 |
| Oct. 26, 1984 | [JP] | Japan | 59-226565 |
| Oct. 26, 1984 | [JP] | Japan | 59-226564 |

[51] Int. Cl.$^4$ .................. F25B 45/00; F16K 31/18
[52] U.S. Cl. ........................ 62/149; 62/126; 62/292; 137/410; 137/558
[58] Field of Search ............ 62/125, 127, 129, 149, 62/292, 126, 77; 73/307, 314, 319; 340/625, 623, 624; 165/11.1; 137/392, 393, 558, 410, 412

[56] References Cited

U.S. PATENT DOCUMENTS

| 2,165,569 | 7/1939 | Obermaier | 62/129 |
| 3,391,547 | 7/1968 | Kingston | 62/126 X |
| 3,813,893 | 6/1974 | Gemender et al. | 62/129 |
| 4,483,367 | 11/1984 | Ross, Jr. et al. | 73/307 X |
| 4,553,400 | 11/1985 | Branz | 62/129 X |

FOREIGN PATENT DOCUMENTS

4714303 5/1972 Japan.

*Primary Examiner*—Harry Tanner
*Attorney, Agent, or Firm*—Leydig, Voit & Mayer, Ltd.

[57] ABSTRACT

In an air cooling system including a compressor, a condenser, a liquid tank, an expansion valve and an evaporator which are connected through conduits to form a closed circuit refrigeration system, there is provided a refrigerant over-charging checking system for preventing the system from being overcharged with the refrigerant. The checking system comprises a service valve mounted in a conduit of the system and having therein a refrigerant inlet passage for flowing the refrigerant into the closed refrigeration system, a check mechanism associated with the service valve to block the refrigerant inlet passage when electrically energized, and a liquid level sensor associated with the liquid tank to electrically energize the check mechanism when a refrigerant level in the liquid tank rises to a predetermined level.

15 Claims, 9 Drawing Figures

REFRIGERANT OVER-CHARGING CHECKING SYSTEM OF CLOSED CIRCUIT REFRIGERATION AIR COOLING SYSTEM

BACKGROUND OF THE INVENTION

1. Field of the Invention

The present invention relates in general to automotive air cooling systems, and more particularly to a refrigerant over-charging checking system for preventing a closed circuit refrigeration air cooling system from being over charged with the refrigerant.

2. Description of the Prior Art

In order to charge or recharge the closed circuit refrigeration air cooling system with refrigerant, a so-called service valve has been mounted in a conduit of the system. Upon the requirement for charging, a charging hose from a refrigerant container is coupled with the service valve, and then the associated compressor is driven at a relatively low speed for a certain time. Usually, this charging work is carried out while observing the condition in the system through a sight glass mounted to the conduit (or a liquid tank). However, this work sometimes induces overcharging of the system due to the inherently difficult task of detecting the critical state of the refrigerant through the sight glass. Overcharging of the system causes poor function of the same, and thus it should be avoided.

SUMMARY OF THE INVENTION

It is therefore an essential object of the present invention to provide a refrigerant over-charging checking system by which the above-mentioned overcharging is avoided.

According to the present invention, there is provided an improved refrigerant over-charging system used in an air cooling system including a compressor, a condenser, a liquid tank, an expansion valve and an evaporator which are connected through conduit means to form a closed circuit refrigeration system. The improved refrigerant over-charging checking system comprises a service valve mounted to the conduit means and having therein a refrigerant inlet passage for introducing the refrigerant into the closed circuit refrigeration system, first means for blocking the refrigeration inlet passage when electrically energized, and second means for electrically energizing the first means when a refrigerant level in the liquid tank rises to a predetermined level.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

Figure 1:
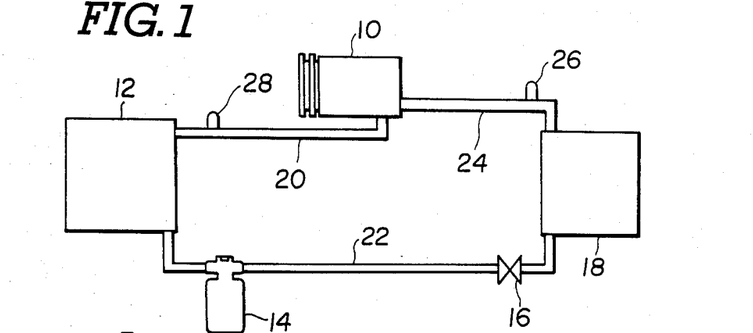
FIG. 1 is a schematic illustration of refrigerant circuit in automobile air cooling system, to which the present invention is practically applied.

Referring to FIG. 1, there is schematically shown a refrigerant circuit of automobile air cooling system to which the present invention is practically applied. The circuit comprises a compressor 10 driven by an engine (not shown), a condenser 12, a liquid tank 14, an expansion valve 16 and an evaporator 18 which are connected through conduits 20, 22 and 24 to form a closed circuit refrigeration system. Service valves 26 and 28 are mounted to the conduits 24 and 20 for charging the refrigerant into the system.

In operation, hot refrigerant vapor (gas) is drawn into the Compressor 10 and pumped into the condenser 12 under pressure where the refrigerant vapor is cooled and thus liquefied, and then, the liquid refrigerant is flowed into the liquid tank 14. The liquid refrigerant under high pressure from the liquid tank 14 is then decompressed by the expansion valve 16 and released to the broad interior of the evaporator 18 to vaporize and absorb heat from the air in the passenger compartment. The heat-laden refrigerant vapor is then drawn into the compressor 10 to start another refrigeration cycle.

Figure 2:
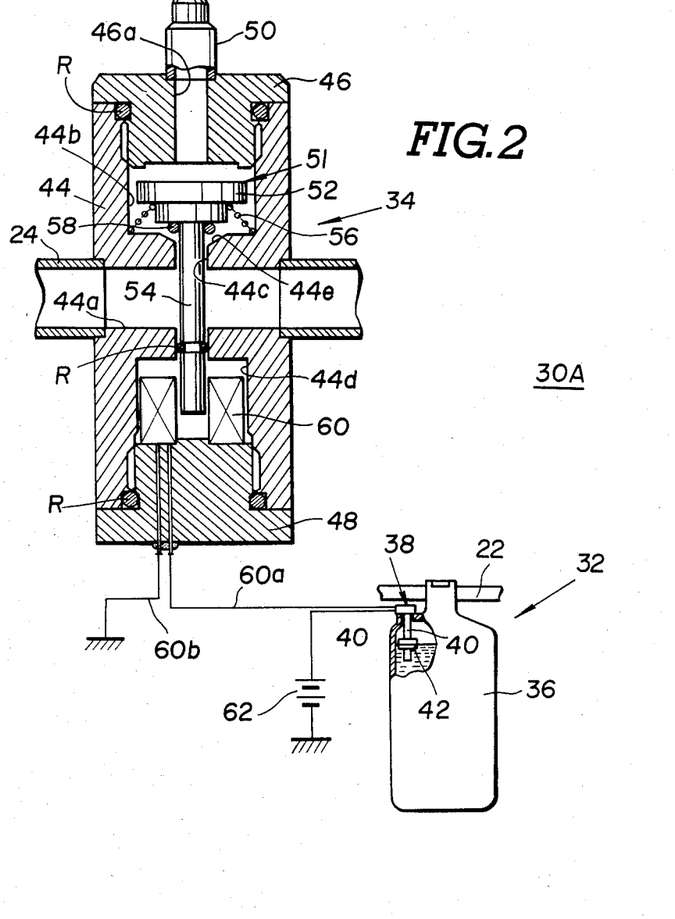
FIG. 2 is a sectional view of a refrigerant over-charging checking system of a first embodiment of the present invention.

Referring to FIG. 2, there is shown a first embodiment of a refrigerant over-charging checking system according to the present invention, which is to be practically applied to the above-mentioned closed refrigeration system of FIG. 1.

The refrigerant over-charging checking system 30A of the invention comprises generally two major parts, which are a level sensor-mounted liquid tank 32 employed in place of the above-mentioned liquid tank 14 and a check-mounted service valve 34 employed in place of the above-mentioned service valve 26 or 28.

The level sensor-mounted liquid tank 32 comprises a tank proper 36 which contains therein the liquid refrigerant, and a level sensor 38 mounted to the tank 36 to sense a predetermined level of the liquid refrigerant in the tank 36. In the disclosed embodiment, a known float type switch is employed for use as the level sensor 38, which comprises a float guide 40 within which a magnetically operable switch (not shown) is disposed, and a float 42 axially movably disposed about the float guide 40. The float carries thereon a magnet (not shown). When, due to rising of the refrigerant level in the tank 36, the float 42 comes to the predetermined level, the magnetically operable switch in the float guide 40 is closed.

The check-mounted service valve 34 comprises a valve casing 44 having therein a through passage 44a which constitutes a part of the conduit 24 (or 20) of the closed circuit refrigeration system of FIG. 1 when properly mounted thereto. The valve casing 44 further has therein an axially extending bore which is merged at its reduced middle portion 44c with the through passage 44a.

As is shown in FIG. 2, the axially extending bore is enlarged at its both ends to form enlarged upper and lower bore portions 44b and 44d which are enclosed respectively by upper and lower plugs 46 and 48 through seal rings R. The upper plug 46 has therein a passage 46a exposed to the enlarged upper bore portion 44b of the valve casing 44. For the purpose as will become apparent hereinafter, the reduced middle bore portion 44c is tapered at a part 44e which is exposed to the enlarged upper bore portion 44b. An inlet valve (or one-way valve) 50 is fixed to the plug 46 to sealingly close the passage 46a. As will become apparent as the description proceeds, upon requirement of refrigerant charging into the system, a suitable coupler on a charging hose of a refrigerant container (not shown) is fitted to the inlet valve 50.

For blocking the connection between the passage 46a and the through passage 44a in a certain condition, a check mechanism 51 is associated with the axially extending bore of the valve casing 44, which comprises an enlarged valve head 52 movably received in the enlarged upper portion 44b of the bore and a valve stem 54 extending from the head 52 toward the enlarged lower portion 44d of the bore through the reduced middle bore portion 44c of the same. A small seal ring R is arranged to constantly block the connection between the through passage 44a and the enlarged lower portion 44d of the bore. A coil spring 56 is disposed in the enlarged upper bore portion 44b to bias the valve body (that is, the unit consisting of the valve head 52 and the valve stem 54) upwardly in FIG. 2, that is, in the direction to move the valve head 52 away from the tapered opening 44e of the reduced middle bore portion 44c of the valve casing 44. A seal ring 58 is disposed about the valve stem 54 to move therewith so that, upon movement of the valve body in the downward direction in FIG. 2 against the force of the spring 56, hermetical sealing is established between the enlarged upper bore portion 44b and the reduced lower bore portion 44c.

Within the enlarged lower bore portion 44d of the valve casing 44, there is disposed a coil 60 from which two lead lines 60a and 60b extend to the level sensor 38 of the liquid tank 36 through a battery 62. Thus, it will be appreciated that when, due to rising of the refrigerant level in the liquid tank 56, the float 42 comes to the predetermined level and thus issues ON signal to the coil 60, the latter becomes energized to attract the valve body against the force of the spring 56. Thus, in this condition, the valve body closes the reduced middle bore portion 44c of the valve casing 44 thereby blocking the fluid communication between the passage 46a of the plug 46 and the interior of the conduit 24 of the closed circuit refrigeration system.

In order to charge originally or recharge the system with the refrigerant, the following steps are taken. It is to be noted that under such condition, the level sensor proper 38 assumes its OFF state due to lack of the refrigerant in the liquid tank 36.

Upon requirement of the refrigerant charging, the coupler-mounted charging hose (not shown) of the refrigerant container is sealingly connected to the inlet valve 50 of the plug 46. Then, the compressor 10 is driven at a relatively low speed (practically, this low speed driving of the compressor 10 is achieved by operating the associated engine under idling condition), so that the refrigerant is smoothly fed into the closed refrigeration system. Thereafter, when, due to rising of the refrigerant level in the liquid tank 36, the float 42 comes to the predetermined level, the level sensor 38 issues ON signal to the coil 60 of the service valve 34. With this, the coil 60 becomes energized thereby attracting the valve body to close the middle bore portion 44c. Upon this, the flow of refrigerant to the system is shut out thereby preventing the undesirable refrigerant at over-charging to the cooling system.

Figures 3, 4:
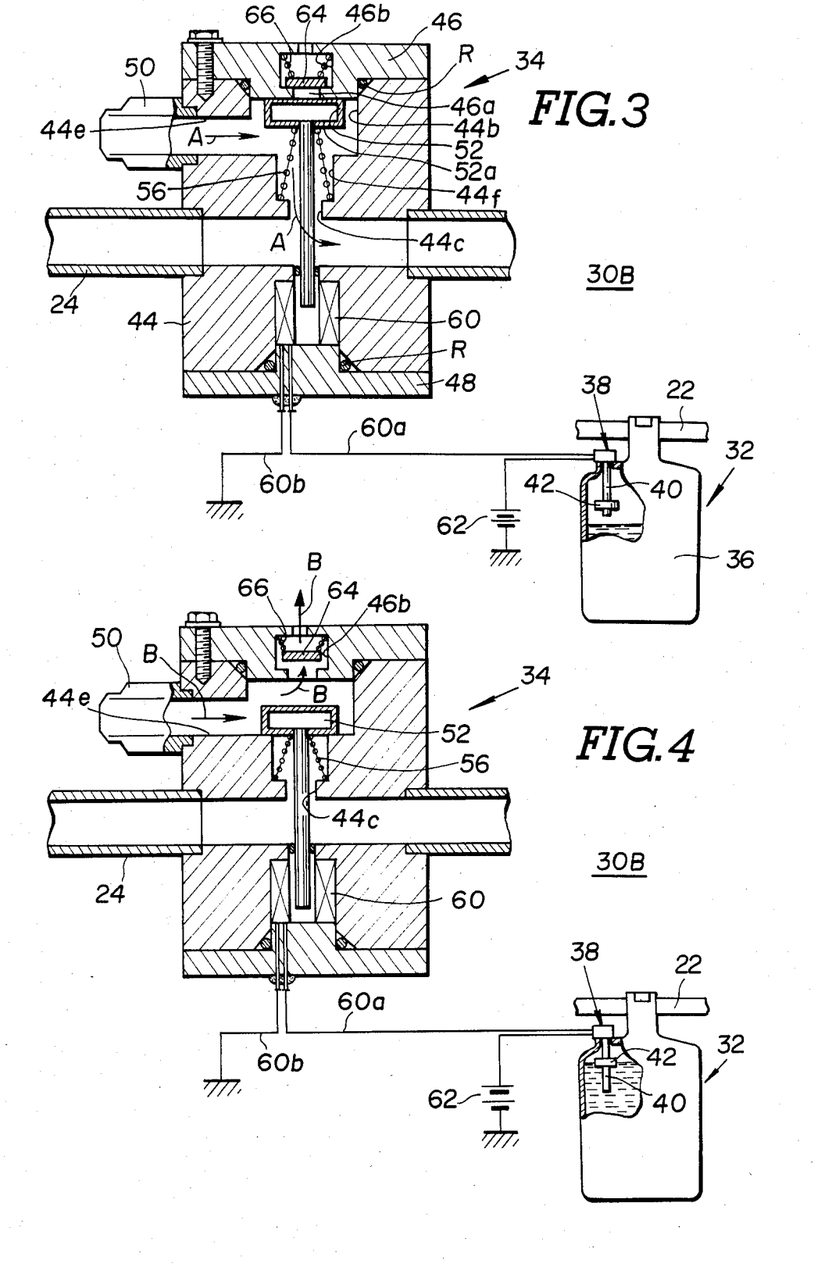
FIGS. 3 and 4 are views similar to FIG. 2, but showing a second embodiment of the present invention, in different conditions.

Referring to FIGS. 5 and 4, there is shown a second embodiment 30B of the present invention, which is a slight modification of the first embodiment. The second embodiment 30B is constructed to have an indicator means by which the full-charge (or proper charge) of the refrigerant to the system is visually indicated. For ease with which the description is made, substantially same parts and constructions as those in the first embodiment of FIG. 2 will be designated by the same numerals and detailed explanation of them will be omitted from the following description.

As is seen from FIG. 3, in the second embodiment 30B, the valve casing 44 has further a passage 44e which extends laterally from the enlarged upper bore portion 44b of the casing 44. The passage 44e is usually closed by the inlet valve 50 fixed to the casing 44. The upper plug 46 has a passage 46a whose middle portion is enlarged to form a chamber 46b in which a check valve is installed as will be described hereinafter. The valve head 52 is constructed and sized to close selectively the passage 46a (see FIG. 3) and the bore 44f (see FIG. 4) formed between the enlarged upper bore portion 44b and the reduced middle bore portion 44c in response to the axial movement of the valve body. Like the case of the first embodiment, the coil spring 56 is arranged to bias the valve head 52 away from the bore 44f, that is, in a direction to sealingly close the passage 46a of the upper plug 46. The valve head 52 is lined with a sealing material 52a.

Within the chamber 46b of the plug 46, there is arranged a check valve which comprises a valve plate 64 and a coil spring 66 by which the valve plate 64 is pressed upon the opening of the passage 46a to close the same, as shown. The coil 60 is connected to the level sensor 38 which is associated with the liquid tank 36. Upon charging, the refrigerant flows in the direction of the arrows A, and when the refrigerant level in the liquid tank 36 comes to the predetermined level representative of full-charge of the refgirerant in the cooling system, the level sensor 38 energizes the coil 60 thereby moving the valve body downward to close the bore 44f. Thus, the refrigerant charging stops. At the same time, the pressure in the enlarged upper bore portion 44b lifts the valve plate 64 against the force of the spring 66 thereby opening the passage 46a, so that, as is seen from FIG. 4, the refrigerant is discharged to the open air through the passage 46a by taking the way indicated by the arrows B. Thus, an operator (that is, service man) can visually notice the full-charge in the closed circuit refrigeration system.

Figures 5, 6:
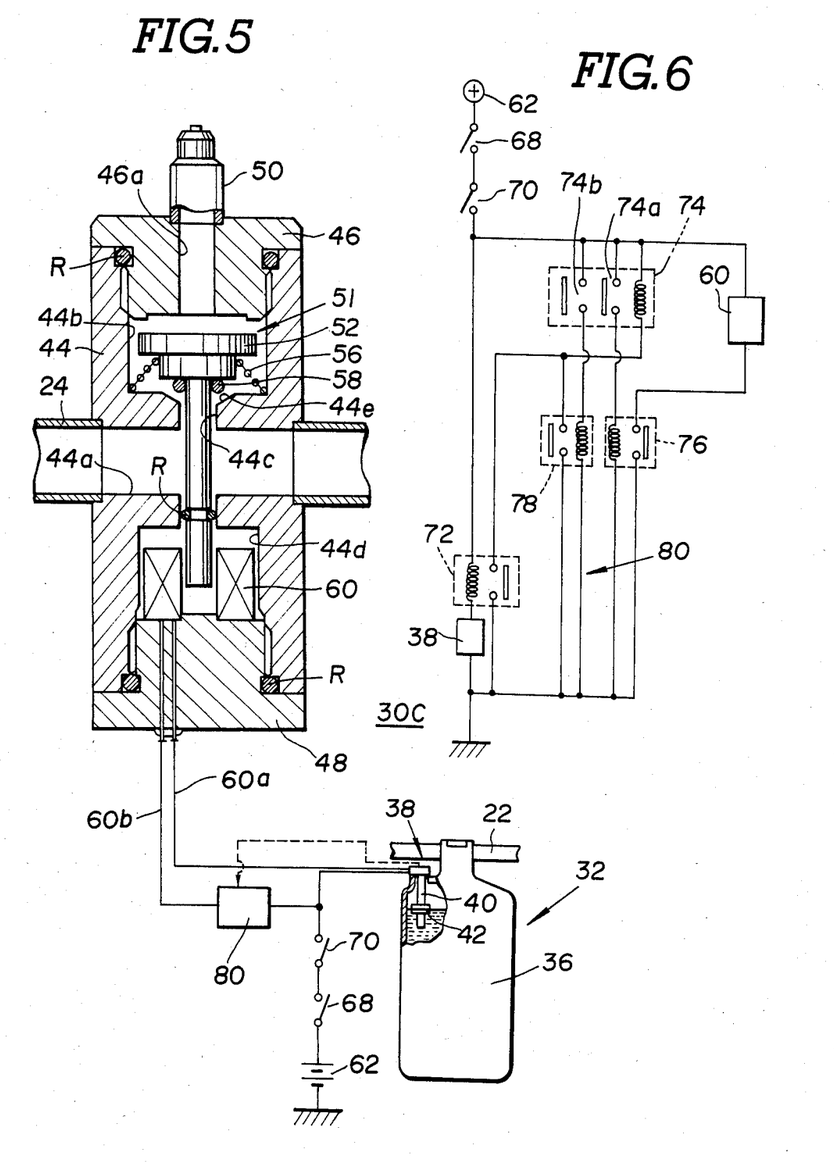
FIG. 5 is a view similar to FIG. 2, but showing a third embodiment of the present invention.
FIG. 6 is a control circuit employed in the third embodiment of FIG. 5.

Referring to FIGS. 5 and 6, particularly FIG. 5, there is shown a third embodiment 30C of the present invention, which is substantially the same in construction as the afore-mentioned first embodiment 30A (FIG. 2) except for an electric circuit interposed between the liquid level sensor 38 of the liquid tank 36 and the coil 60 of the check mechansim 51 in the service valve 34. As will become apparent as the description proceeds, the electric circuit is so arranged that once the level sensor 38 issues ON signal due to sufficient rising of the refrigerant level in the liquid tank 36, the energization of the coil 60 is maintained even when the refrigerant level lowers below the predetermined level thereafter.

The electric circuit employed in this embodiment 30C comprises a battery 62, an ignition switch responsive switch 68, a switch 70 for the air cooling system and the liquid level sensor 38 which are connected in series. The switch 68 is designed to close and open selectively in response to closing and opening of the associated ignition switch. As is seen from FIG. 6, the electric circuit further comprises relay switches 72, 74 and 76 which are arranged to assume their ON conditions when the liquid level sensor 38 issues ON signal. The relay switch 74 includes two switches 74a and 74b which operate in the same manner. The switch 74b is connected to another relay switch 78 to constitute a condition keeping means 80 which is arranged in parallel with the liquid level sensor 38. The relay switch 78 is designed to close when electrically energized, as is understood from the drawing.

When, with the switches 68 and 70 assuming their CLOSE positions, the float 42 of the level sensor 38 comes to the predetermined level due to rising of the refrigerant level in the liquid tank 36, the sensor 38 issues ON signal thereby energizing the relay switches 72, 74 and 76. With this, the coil 60 of the service valve 34 is energized thereby to close the refrigerant inlet passage 44c like in the case of the first embodiment. Under this condition, the relay switch 78 is energized to assume its ON condition. Thus, even when, thereafter, the refrigerant level in the liquid tank 36 lowers below the predetermined level for some reasons, energization of the coil 60 is kept keeping the inlet passage shut out condition. This is very advantageous when considering a fact in which, during charging of refrigerant into the cooling system, the refrigerant level in the liquid tank 36 rises and falls frequently due to often change in idling speed of the associated engine. That is, in the afore-mentioned first embodiment of FIG. 2, the valve body is forced to open and close the refrigerant passage 44c in response to the falling and rising of the refrigerant level in the liquid tank 36. This may cause not only the undesirable over-charging of the refrigerant to the cooling system but also uncomfortable chattering of the valve body.

Figure 7:
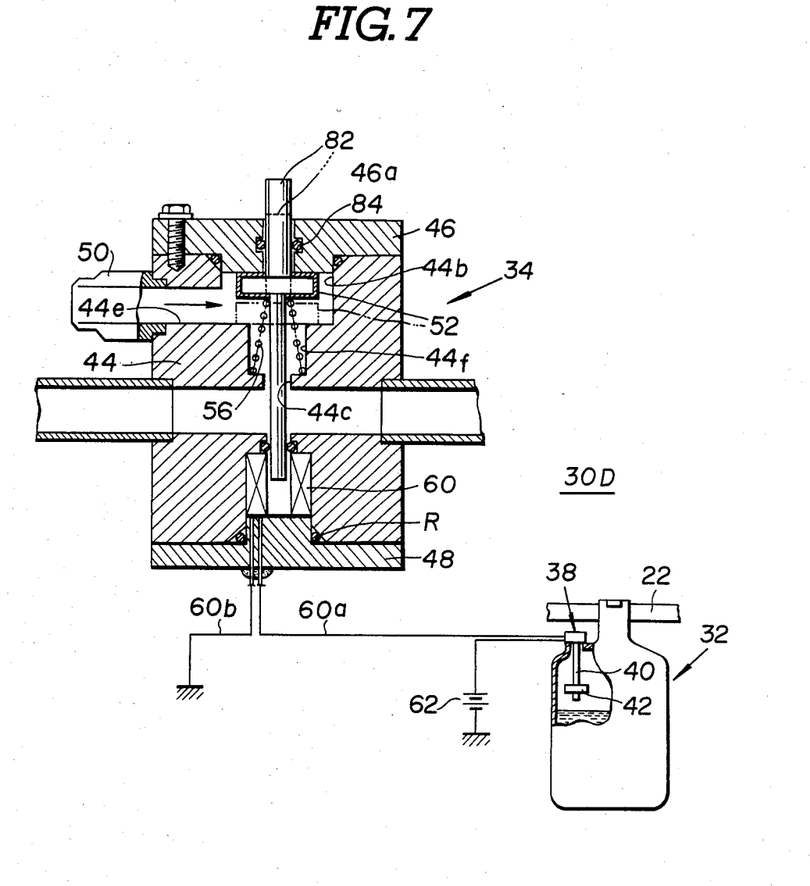
FIGS. 7, 8 and 9 are views similar to FIG. 2, but showing fourth, fifth and sixth embodiments of the present invention.

Referring to FIG. 7, there is shown a fourth embodiment 30D of the present invention, which is substantially the same in construction as the second embodiment 30B of Figs. 5 and 4 except for the indicator means by which the full-charge of the refrigerant to the cooling system is visually indicated.

The indicator means employed in this fourth embodiment 30D comprises a cylindrical bar 82 which is fixed to the valve head 52 of the valve body to move therewith. The bar 82 passes through a bore 46a formed in the upper plug 46 and projects outwardly from the same. More particularly, the bar 82 is so sized and arranged that the leading end (viz., the outwardly projected end of the bar 82) is pulled into the bore 46a when the valve head 52 is moved downward to assume its CLOSE position as is indicated by a phantom line. A seal ring 84 is disposed in the bore 46 to establish sealing between the bar 82 and the bore wall.

Upon full-charging of the refrigerant into the cooling system, the valve body is moved down to stop the refrigerant charging. In response to this action, the bar 82 is pulled into the bore 46a of the plug 46 thereby permitting the operator (viz., service man) to notice the full-charging visually.

Figure 8:
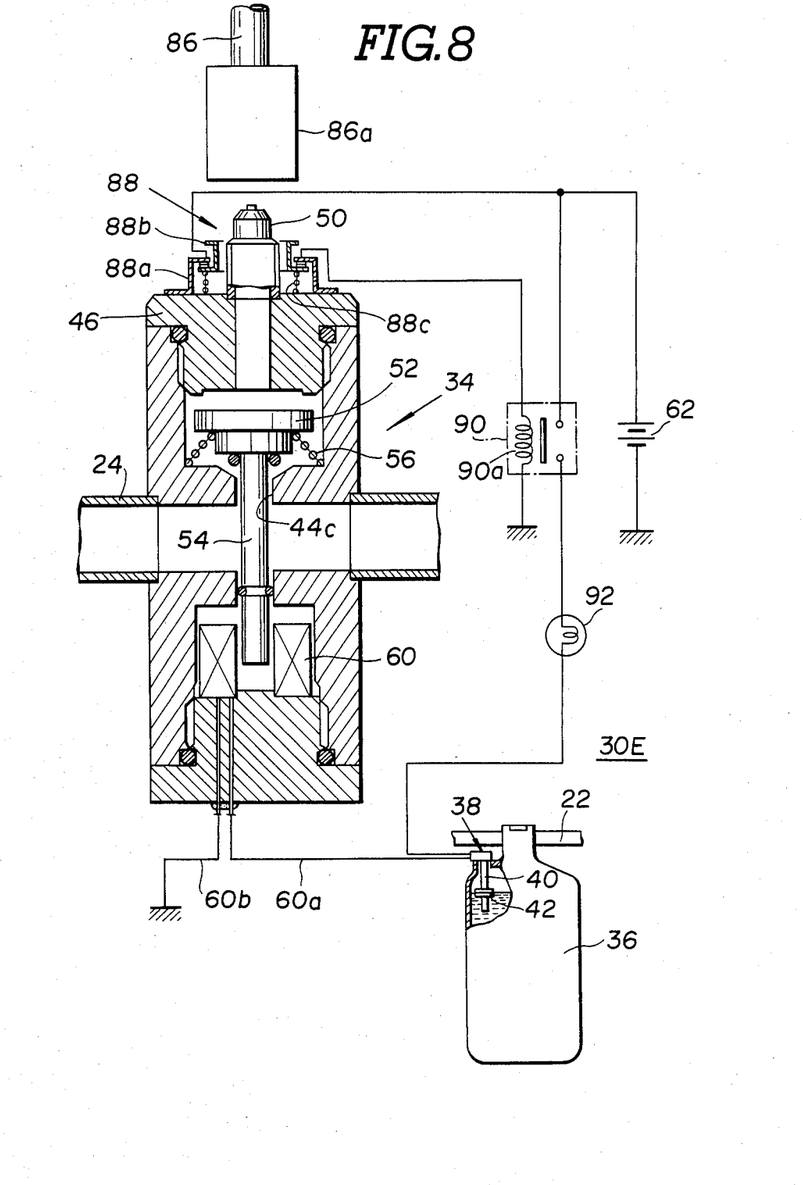

Referring to FIG. 8, there is shown a fifth embodiment 30E of the present invention, which is substantially the same in construction as the first embodiment 30A of FIG. 2 except for a full-charge indicating means. As will become apparent as the description proceeds, in the fifth embodiment of the invention, the full-charge of the refrigerant to the cooling system is visually indicated by an electric lamp and once, thereafter, a coupler on a charging hose of the refrigerant container is disconnected from the inlet valve 50, the coil 60 of the service valve is deenergized and kept deenergized thereby keeping the valve body in its open position as is seen from FIG. 8. Due to the nature of the inlet valve 50, the refrigerant in the cooling system does not leak.

The indicator means employed in the fifth embodiment 30E comprises a switch 88 which is constructed to assume its OFF position when a coupler 86a on a charging hose 86 extending from the refrigerant container is properly fitted to the inlet valve 50. The switch 88 comprises an annular stand 88a secured to the upper plug 46 in a manner to surround the inlet valve 50. The stand 88a is provided at its inner peripheral portion with two spaced stationary contacts (no numerals) which are electrically insulated from the stand 88a. An annular member 88b carrying thereon an annular contact (no numeral) is axially movably received in the stand 88a with the annular contact thereof facing the two stationary contacts of the stand 88a. A coil spring 88c is disposed in the annular stand 88a to bias the movable annular member 88b in the direction to contact to the two stationary contacts. Thus, under unstressed condition, the switch 88 assumes its CLOSE position. One of the stationary contacts is connected to an energizing coil 90a of a relay switch 90. The other stationary contact is connected in parallel to a battery 62 and one contact of the relay switch 90. The other contact of the relay switch 90 is connected though an electric lamp 92 to the liquid level sensor 38 of the liquid tank 36. Thus, it will be appreciated that under unstressed condition of the switch 88, the energizing coil 90a of the relay switch 90 is kept energized thereby keeping the relay switch 90 in its OFF (OPEN) position.

When, upon requirement of refrigerant charging into the cooling system, the coupler 86a on the charging hose of the refrigerant container is properly fitted to the inlet valve 50, the switch 88 opens thereby to cause the relay switch 90 to assume its ON (CLOSE) position. Thus, when, thereafter, the level sensor 38 issues ON signal due to sufficient rising of the refrigerant level in the liquid tank 36, the coil 60 of the service valve 34 is enegized thereby to attract the valve body to close the reduced middle bore portion 44c, like in the case of the first embodiment of FIG. 2. At the same time, the lamp 92 is energized to light thereby permitting the operator (viz., service man) to notice the full-charging. When, thereafter, the coupler 86a of the charging hose 86 is disconnected from the inlet valve 50, the switch 88 becomes into ON (CLOSE) condition thereby causing the relay switch 90 to assume its OFF (OPEN) position. Thus, the lamp 92 is turned off and at the same time, the valve body opens the middle bore portion 44c by the action of the spring 56. However, due to the nature of the inlet valve 50, the refrigerant in the cooling system does not leak as is described hereinafore. If desired, an electric buzzer may be used in place of the lamp 92. In this case, the full-charge of the cooling system is noticed acoustically.

Figure 9:
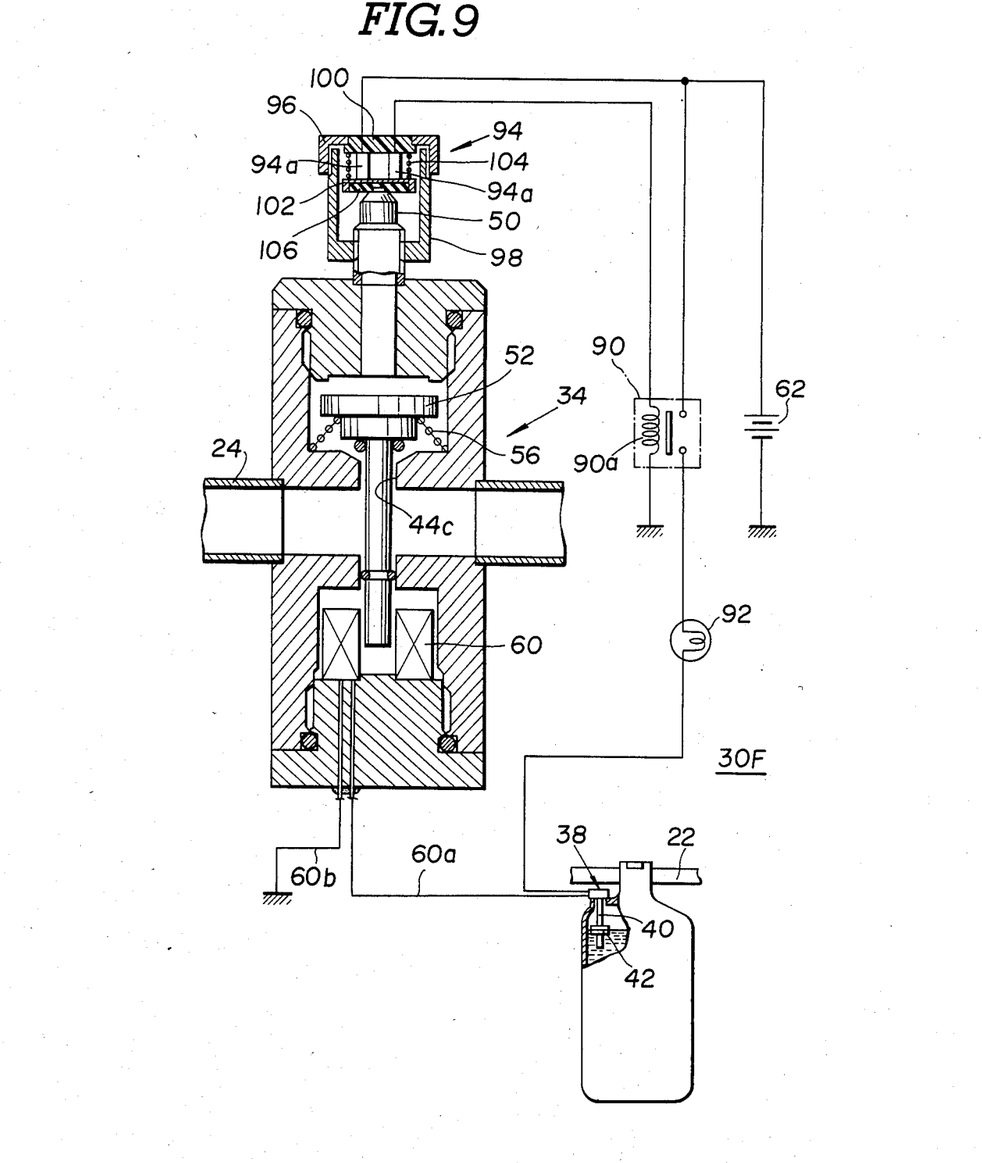

Referring to FIG. 9, there is shown a sixth embodiment 30F of the present invention, which is a slight modification of the fifth embodiment 30E of FIG. 8.

In the sixth embodiment 30F, a so-called lid switch 94 is used in place of the switch 88 of the fifth embodiment 30E. The lid switch 94 is mounted to a lid 96 of an inlet valve cover 98. The valve cover 98 is tightly disposed on the inlet valve 50 to protect the same. The lid switch 94 comprises two spaced stationary contacts 94a secured to the lid 96 through an electrically insulating member 100. A movable contact 102 is connected to the lid 96 by means of an expansion coil spring 104. The movable contact 102 is lined at its outside surface with an insulating layer 106. Upon fixing the lid 96 to the cover 98 as is shown in the drawing, the head of the inlet valve 50 contacts and pushes the movable contact 102 upon the two stationary contacts 94a to connect the same. Thus, in this condition, lid switch 94 assumes its ON position. While, when the lid 96 is removed from the cover 98, the movable contact 102 is sprung away from the stationary contacts 94a thereby breaking the connection therebetween. Thus, in this condition, the lid switch 94 assumes its OFF position. As is understood from the drawings, the electric circuit used in this embodiment is substantially the same as that in the fifth embodiment 30E of FIG. 8. Thus, like in the case of the fifth embodiment 30E, when the lid 96 is fitted to the valve cover 98, the relay switch 90 assumes its OFF (OPEN) condition.

When, upon requirement of refrigerant charging into the cooling system, the lid 96 is removed from the valve cover 98 for connecting the charging hose of the refrigerant container with the inlet valve 50, the lid switch 94 becomes OFF as is described hereinabove causing the relay switch 90 to assume its ON (CLOSE) position. Thus, when, thereafter, the level sensor 38 issues ON signal due to sufficient rising of the refrigerant level in the liquid tank 36, the coil 60 of the service valve 34 is energized thereby to close the middle bore portion 44c with the valve body, like in the case of the fifth embodiment 30E. At the same time, the lamp 92 is energized to light to warn the operator of full-charge of the refrigerant in the system. When, thereafter, the lid 96 is fastened to the valve cover 98 after disconnecting the charging hose of the refrigerant container from the inlet valve 50, the lid switch 94 becomes into ON (CLOSE) condition thereby causing the relay switch 90 to assume its OFF (OPEN) position. Thus, the lamp 92 is turned off and at the same time, the valve body opens the middle bore portion 44c.

What is claimed is:

1. In an air cooling system including a compressor, a condenser, a liquid tank, an expansion valve and an evaporator which are connected through conduit means to form a closed circuit refrigeration system, a refrigerant over-charging checking system comprising:
   a service valve mounted to said conduit means and having therein a refrigerant inlet passage for introducing the refrigerant into said closed circuit refrigeration system;
   first means for blocking said refrigerant inlet passage when electrically energized; and
   second means for electrically energizing said first mean when a refrigerant level in said liquid tank rises to a predetermined level.

2. A refrigerant over-charging checking system as claimed in claim 1, in which said first means comprises an electromagnetically operable means and in which said second means comprises a liquid level sensor mounted to said liquid tank in a manner to issue ON signal when the refrigerant level in said liquid tank comes to said predetermined level.

3. A refrigerant over-charging checking system as claimed in claim 2, in which said electromagnetically operable means comprises:
   a valve body which is capable of closing said refrigerant inlet passage when moved in a given direction;
   biasing means for biasing said valve body in a direction to open said refrigerant inlet passage; and
   a coil which attracts said valve body in said given direction when electrically energized.

4. A refrigerant over-charging checking system as claimed in claim 3, in which said liquid level sensor comprises:
   a float guide within which a magnetically operable switch is installed, said float guide being disposed in said liquid tank; and
   a float movable along the float guide in said liquid tank, said float carrying thereon a magnet,
   whereby when, due to rising of the refrigerant level in said liquid tank, the float comes to the predetermined level, said magnetically operable switch in said float guide is brought into ON condition.

5. A refrigerant over-charging checking system as claimed in claim 3, further comprising a seal ring which is disposed about a valve stem portion of said valve body to assure closing function of said valve body.

6. A refrigerant over-charging checking system as claimed in claim 3, further comprising a full-charge indicating means which visually indicates the full-charging of the refrigerant into closed circuit refrigeration system when said liquid level sensor issues ON signal.

7. A refrigerant over-charging checking system as claimed in claim 6, in which said full-charge indicating means comprises;
   means defining in said service valve a through passage the middle portion of which is enlarged to form a chamber, said through passage being closed by said valve body when said valve body opens said refrigerant inlet passage;
   a valve plate movably received in said chamber;
   biasing means for biasing said valve plate to close said through passage in a manner to block a fluid communication between the open air and said refrigerant inlet passage.

8. A refrigerant over-charging checking system as claimed in claim 3, in which a valve head of said valve body is lined with a sealing material to assure the closing function thereof.

9. A refrigerant over-charging checking system as claimed in claim 3, further comprising an electric circuit which is so arranged that once the liquid level sensor issues ON signal due to rising of the refrigerant in said liquid tank, the energization of said coil is maintained even when the level sensor issues OFF signal thereafter.

10. A refrigerant over-charging checking system as claimed in claim 6, in which said full-charge indicating means comprises:
   means defining in said service valve a through passage which connects said refrigerant inlet passage with the open air, said through passage being closed by said valve body when said valve body opens said refrigerant inlet passage;
   an indicator bar slidably disposed in said through passage and connected to said valve body to move therewith, said indicator bar being so sized and constructed as to project outwardly from said through passage when said valve body closes said through passage.

11. A refrigerant over-charging checking system as claimed in claim 10, further comprising a seal ring which is disposed in said through passage to establish hermetical sealing between said indicating bar and the wall of said through passage.

12. A refrigerant over-charging checking system as claimed in claim 6, in which said full-charge indicating means comprises:
   switch means which issues OFF signal when a refrigerant charging hose is properly fitted to said service valve for the purpose of introducing the refrigerant into said closed circuit refrigeration system;
   a relay switch which assumes its ON condition when said switch means issues OFF signal;
   an electric lamp connected in series with said relay switch; said lamp being connected through said liquid level sensor to said coil.

13. A refrigerant over-charging checking system as claimed in claim 12, in which said switch means comprises a switch which is constructed to assume its OFF condition when a coupler-mounted refrigerant charging hose is properly fitted to said service valve for the purpose of introducing the refrigerant into the closed circuit refrigerant system.

14. A refrigerant over-charging checking system as claimed in claim 13, in which said switch comprises:
   a stand secured to Said service valve;
   two spaced stationary contacts attached to the stand with an interposal of electrically insulating material therebetween;
   a movable member movable relative to said stand and carrying thereon a single contact; and
   biasing means for biasing said movable member in a direction to contact said single contact with said two stationary contacts.

15. A refrigerant over-charging checking system as claimed in claim 12, in which said switch means is a lid switch which is mounted to a lid of an inlet valve cover, said valve cover being tightly disposed on a refrigerant inlet valve to protect the same, said lid switch comprising two spaced stationary contacts secured to said lid with an interposal of an electrically insulating member therebetween, a movable contact movable relative to said two stationary contacts, and biasing means for biasing said movable contact away from said stationary contacts, said movable contact being brought into contact with said two stationary contacts when said lid is properly fitted to said cover.

* * * * *